(12) United States Patent
Lin

(10) Patent No.: US 7,469,095 B1
(45) Date of Patent: Dec. 23, 2008

(54) DVD-ROM BACKWARDS COMPATIBLE DEFECTIVE SECTOR MANAGEMENT IN RECORDABLE DVD MEDIA

(75) Inventor: Shu Lin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1110 days.

(21) Appl. No.: 10/129,587

(22) PCT Filed: Nov. 7, 2000

(86) PCT No.: PCT/US00/30604

§ 371 (c)(1),
(2), (4) Date: Aug. 30, 2002

(87) PCT Pub. No.: WO01/35407

PCT Pub. Date: May 17, 2001

Related U.S. Application Data

(60) Provisional application No. 60/164,806, filed on Nov. 10, 1999.

(51) Int. Cl.
*H04N 5/91* (2006.01)
(52) U.S. Cl. .................. 386/126; 386/46; 386/125; 386/95; 386/110; 386/109
(58) Field of Classification Search ......... 386/111–112, 386/124–126, 46, 95, 110, 109
See application file for complete search history.

(56) References Cited

U.S. PATENT DOCUMENTS 5,394,534 A * 2/1995 Kulakowski et al. ........ 711/112

(Continued)

FOREIGN PATENT DOCUMENTS

EP 0845780 6/1998

(Continued)

OTHER PUBLICATIONS (See Ref. AM) Patent Abstracts of Japan, vol. 1999, No. 12, Oct. 29, 1999 and Japan 11-203841.

(Continued)

*Primary Examiner*—Thai Tran
*Assistant Examiner*—Helen Shibru
(74) *Attorney, Agent, or Firm*—Joseph J. Laks; Robert B. Levy; Jorge Tony Villabon

(57) ABSTRACT

A method for DVD-ROM backwards-compatible defective sector management in recordable DVD media can include the following steps. Initially, a first block of logically contiguous sectors can be allocated in which indivisible data can be written to the recordable DVD media. In particular, the allocation step can occur prior to or during a write process. Additionally, the allocation step can occur as part of the write process. In any case, a defective sector can be detected and located in the first block of sectors. Notably, in the preferred embodiment, the step of detecting and locating can include consulting a defect list in the recordable DVD media. In particular, the defect list can contain a list of sectors determined to be defective. Finally, responsive to detecting and locating the defective sector, the indivisible data can be shifted from the first block to a second block of logically contiguous sectors in the recordable DVD media. Significantly, in accordance with the inventive arrangements, the second block does not contain the defective sector.

33 Claims, 7 Drawing Sheets

U.S. PATENT DOCUMENTS

| | | | | |
|---|---|---|---|---|
| 6,092,232 | A * | 7/2000 | Nagai et al. | 714/769 |
| 6,223,302 | B1 * | 4/2001 | Nakamura et al. | 714/8 |
| 6,584,276 | B2 * | 6/2003 | Ando et al. | 386/95 |
| 6,725,321 | B1 * | 4/2004 | Sinclair et al. | 711/103 |
| 6,978,084 | B2 * | 12/2005 | Gotoh et al. | 386/95 |
| 2001/0002947 | A1 * | 6/2001 | Miyawaki et al. | 386/113 |
| 2002/0018643 | A1 * | 2/2002 | Okada et al. | 386/95 |
| 2002/0144028 | A1 * | 10/2002 | Schatzberg | 710/36 |
| 2002/0168174 | A1 * | 11/2002 | Ito | 386/65 |

FOREIGN PATENT DOCUMENTS

| | | |
|---|---|---|
| EP | 0866456 | 9/1998 |
| EP | 0911827 | 4/1999 |
| JP | 11-203841 | 7/1999 |
| WO | 00/31737 | 6/2000 |

OTHER PUBLICATIONS

"A Review of the DVD-RAM Format Specification", Version 1; Oct. 3, 1998.

* cited by examiner

DVD-ROM BACKWARDS COMPATIBLE DEFECTIVE SECTOR MANAGEMENT IN RECORDABLE DVD MEDIA

This application claims the benefit under 35 U.S.C. § 365 of International Application PCT/US00/30604, filed Nov. 7, 2000, which was published in accordance with PCT Article 21(2) on May 17, 2001 in English; and which claims benefit of U.S. provisional application Ser. No. 60/164,806 filed Nov. 10, 1999.

BACKGROUND OF THE INVENTION

1. Technical Field

The inventive arrangements relate generally to methods and apparatus for providing advanced operating features for recording data to recordable DVD media, and more particularly to a method and apparatus for DVD-ROM backwards-compatible defective sector management in recordable DVD media.

2. Description of the Related Art

Various devices have been developed to enable consumers to record video and/or audio programs for later presentation. Such devices include tape recorders, video cassette recorders, recordable compact disks, and most recently, recordable digital versatile disks (DVD). Hard drives and magneto optical disks have also been used. A DVD in which data can be recorded once only, and thereafter is essentially a DVD read only memory, is referred to by the acronym DVD-R. The acronym DVD-R also has been used generally to refer to write-once, or record-once, technology.

In contrast to DVD-R, several formats exist in which data can be recorded to a DVD, erased and re-recorded. In sum, such a DVD can be overwritten or rewritten. These DVDs typically are referred to by the acronyms DVD-RAM, DVD-RW and DVD+RW. Although, as of this time no uniform industry standard has been adopted, the acronyms DVD-RAM, DVD-RW and DVD+RW have been used generally to refer to the respective re-writable DVD technologies. Still, reference herein to re-writable DVD technology, devices and methods and recordable DVD media is generally intended to encompass all of the standards which are now being used, as well as those which may be developed in the future.

Present DVDs can have a logical file structure in which audio-video content can be stored. Specifically, as shown in FIG. 7, at the top of the file structure hierarchy of a DVD 700, one or more titles 701 can exist which can loosely correlate to program episode titles. Titles 701 can consist of control data 702 in addition to one or more Video Object Sets 703 (VOBS). The control data 702 can contain information for managing the title 701. Each VOBS 703 can include a plurality of Video Objects (VOB) 704. Each VOB 704 preferably includes a plurality of Cells 705. Each Cell 705 preferably includes a plurality of Video Object Units (VOBU) 706. Each VOBU 706 roughly correlates to a group of pictures which is the smallest addressable chunk in the DVD 700.

Notably, each VOBU 706 can contain an integer number of video frames. As such, each VOBU 706 can contain 0.4 to 1.0 seconds of presentation material. A typical VOBU 706 in a commercial motion picture can contain 0.5 second of presentation material. Notably, each VOBU 706 can include a sequence of packs 707 positioned in recording order. Preferably, each VOBU can begin with a navigation pack 708 (NV_PCK or NAV_PACK) which can be followed by audio-visual data packs 709, for example video packs (V_PCK), audio packs (A_PCK) and sub-picture packs (SP_PCK). The NV-PCK 708 can contain navigation information, which can be useful in implementing trick modes of operation. The NV_PCK 708 also can include presentation control information (PCI) and data search information (DSI).

Recordable DVD media can be used for thousands or even tens of thousands of times for recordings. For each recording, defective sectors in the recordable DVD media potentially can arise. As a result, recordable DVD media can accumulate a substantial number of defective sectors during the operational lifetime of the recordable DVD media. Yet, defective sectors in recordable DVD media can inhibit proper playback of data stored in the recordable DVD media. Specifically, defective sectors in the control data area can invalidate the control data. Moreover, defective sectors in video data in a VOBU can cause video freeze or blockiness. Additionally, defective sectors in audio data in a VOBU can cause audio distortion or noise. Finally, defective sectors in a menu area can damage a menu.

In traditional recordable media, for example hard disk drives, generally there exists two methods for managing defective sectors. A first method has been referred to as the "sector slipping method". In the sector slipping method, when a defect is detected in one of the consecutive data sectors, the sector immediately following the defective sector is configured to become the logical next adjacent sector to the valid sector immediately preceding the defective sector. This configuration can be implemented by setting aside the defective sector and mapping the following sector to become the sector logically adjacent to the valid sector. A second method includes the re-allocation of a reserved sector in substitution for the defective sector. Specifically, when a defective sector is detected on one of the tracks of some recordable DVD media, a reserve sector on one of the tracks is re-allocated in substitution for the defective sector.

Notwithstanding traditional methods for defect management, with regard to recordable DVD media, a chosen defect management method must account for existing DVD-ROM technology. Specifically, in recordable DVD media such as DVD-RW, DVD-RAM, DVD+RW and others, a chosen defect management method must not inhibit the requirement that data written to the recordable DVD media remain readable, (e.g. backwards compatible) by current DVD-ROM players. Notwithstanding, currently DVD-ROM players do not have a mechanism for handling defective sectors. Moreover, the DVD-ROM specification requires that data must be continuous on a recordable DVD disk. Nevertheless, the management of defective sectors in recordable DVD media using traditional methods for defect management can cause the data stored in the recordable DVD media to become discontinuous.

SUMMARY

In accordance with the inventive arrangements, a DVD-ROM backwards-compatible defect management method for recordable DVD media is taught herein. The method of the invention constitutes the basic rule that certain indivisible data cannot become discontinuously stored in the recordable DVD media during the management of defects contained therein. In particular, the method of the invention can involve the enforcement of three basic rules. First, control data, for example a control table or map, can never remain separated by a defective sector. Second, a defective sector cannot exist in a control backup file. Finally, the first sector of a VOBU, which according to the DVD-ROM specification, must be a navigation sector, cannot be a defective sector. The enforcement of these rules can guarantee that recordable DVD media remains backwards compatible with the DVD-ROM specification while further ensuring that the playback quality of the recordable DVD media does not become degraded.

A method for DVD-ROM backwards-compatible defective sector management in recordable DVD media can include the following steps. Initially, a first block of logically contiguous sectors can be allocated in which indivisible data can be written to the recordable DVD media. In particular, the allocation step can occur prior to or during a write process. Additionally, the allocation step can occur as part of the write process. In any case, a defective sector can be detected and located in the first block of sectors. Notably, in the preferred embodiment, the step of detecting and locating can include consulting a defect list in the recordable DVD media. In particular, the defect list can contain a list of sectors determined to be defective. Finally, responsive to detecting and locating the defective sector, the indivisible data can be shifted from the first block to a second block of logically contiguous sectors in the recordable DVD media. Significantly, in accordance with the inventive arrangements, the second block does not contain the defective sector.

In the preferred embodiment, the indivisible data can be control data in accordance with the first rule—control data, for example a control table or map, can never remain separated by a defective sector. Accordingly, the first and second blocks of sectors can be contained in a control data area of the recordable DVD media. In accordance with the second rule—a defective sector cannot exist in a control backup file—the indivisible data can be backup control data. As such, the first block of sectors can be contained in a control data backup area of the recordable DVD media. Finally, in accordance with the third rule—the first sector of a VOBU cannot be a defective sector—the indivisible data can be the first sector of a VOBU comprising a navigation sector.

In the case where the indivisible data is control data in a control data area, the method of the invention can further include shifting a backup copy of the control data from a first block of sectors in a control data backup area to a second block of sectors in the control data backup area. Significantly, in this case, the second block in the control data backup area corresponds to the second block of sectors in the control data area. Additionally, the shifting of the backup copy of the control data can occur despite no defective sectors having being detected and located in the first block of sectors in the control data backup area.

In one embodiment of the invention, the method of the invention can also include modifying the defective sector. Preferably, the modification can cause the defective sector to emulate a non-defective sector. In consequence, a DVD player playing back the recordable DVD media can skip the modified defective sector as if the defective sector contained ignorable data. Notably, the defective sector can include a Start Code field, a Stream ID field, a Packet Length field and at least one Packet-Dependent data field. As such, the step of modifying can include one or more of the following: writing some data other than the start code 0x000001BA to the Start Code field, writing a non-existing stream ID (a stream ID corresponding to one of audio, video or subpicture) to the Stream ID field, and writing a zero value to the Packet Length field.

A DVD system for DVD-ROM backwards-compatible defective sector management in recordable DVD media can include means for allocating a first block of logically contiguous sectors for storing indivisible data to the recordable DVD media; means for detecting and locating a defective sector in the first block of sectors; and, means responsive to the detecting and locating means, for shifting the indivisible data from the first block to a second block of logically contiguous sectors in the recordable DVD media, the second block not containing the detected and located defective sector.

In the DVD system of the present invention, the indivisible data can be control data and the first and second blocks of sectors are contained in a control data area of the recordable DVD media. In addition, the indivisible data can be backup control data and the first and second block of sectors are contained in a control data backup area of the recordable DVD media. Finally, the indivisible data can be the first sector of a VOBU comprising a navigation sector, wherein the first sector is a navigation sector.

The DVD system of the present invention can also include means for shifting a backup copy of the control data from a first block of sectors in a control data backup area to a second block of sectors in the control data backup area, the second block in the control data backup area corresponding to the second block of sectors in the control data area. Moreover, the detecting and locating means can include means for consulting a defect list in the recordable DVD media, the defect list containing a list of sectors determined to be defective.

Notably, the DVD system can include means for modifying the defective sector, the modification emulating a non-defective sector. In consequence, a DVD player playing back the VOBU in the recordable DVD media can skip the defective sector as if the defective sector was a non-defective sector containing ignorable data. The defective sector can include a Start Code field, a Stream ID field, a Packet Length field and at least one Packet-Dependent data field. Also, the modifying means can include means for writing data other than the start code 0x000001BA to the Start Code field. Also, the modifying means can include means for writing an unusable stream ID to the Stream ID field. Finally, the modifying means can include means for writing a zero value to the Packet Length field.

DETAILED DESCRIPTION OF THE INVENTION

Recordable DVD Device

Figure 1:
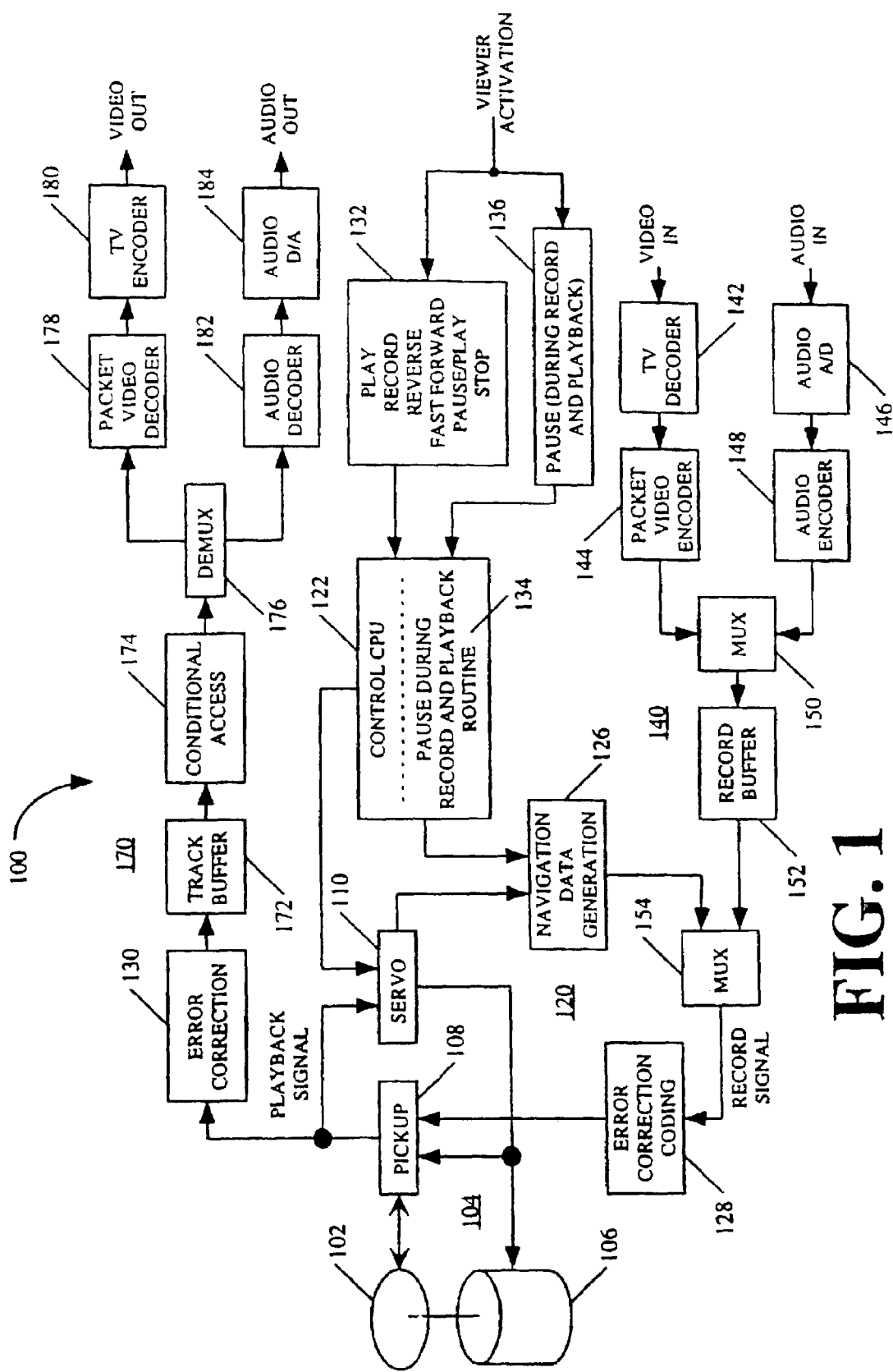
FIG. 1 is a block diagram of a DVD recording device that can be provided with one or more advance operating features in accordance with the inventive arrangements.

A device 100 for implementing the DVD-ROM backwards-compatible defect management method in accordance with the inventive arrangements taught herein utilizes a recordable, re-writable disk medium 102 in accordance with the inventive arrangements is shown in block diagram form in FIG. 1. The re-writable disk medium 102 is embodied as a re-writable DVD in the illustrated embodiment. In many instances, as will be noted, the re-writable disk medium can also be, for example, a hard drive or a magneto optical disk (MOD). An example of a MOD is a minidisk. In many instances, the inventive arrangements are applicable to video or audio or both video and audio.

The device 100 is capable of writing onto and reading from recordable DVD media, in this example, a re-writable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the disk 102 and a pickup assembly 108 that is adapted to be moved over the spinning disk. The pickup 108 and the motor 106 are controlled by a servo 110. The servo 110 can receive a playback signal of data which can be read from a spiral track of the disk 102 as a first input. The playback signal also can be an input to an error correction circuit 130, which can be considered part of the control section or part of the video/audio output processing path.

When reading data from the disk 102, a laser on the pickup assembly 108 can direct laser light at an interior layer surface of the disk 102. Depending upon the data stored on the disk 102, the laser light can be mostly reflected or mostly absorbed. The pickup assembly 108 can interpret reflected light as one type of electrical signal while light absorbed by the interior layer surface of the disk 102 can be interpreted as a second type of electrical signal. In the preferred embodiment, transitions between reflectivity and non-reflectivity are mapped to a digital signal referred to as the playback signal which corresponds to the data stored on the disk 102.

By comparison, during recording, a laser on the pickup assembly burns spots onto a spiral track on the disk 102 in order to digitally record video and/or audio program material. More particularly, the disk 102, which can include at least one interior crystalline recording layer, can exhibit two distinctive states, amorphous or crystalline, each having different reflectivity characteristics. Those different levels of reflectivity can be detected by optical sensors in the pickup assembly 108.

Prior to recording, the interior recording layer of the disk is in a crystalline state exhibiting high reflectivity. The light intensity of a laser beam can be modulated to write amorphous data marks on the surface of tracks in the interior crystalline recording layer. Specifically, the energy of a laser pulse can quickly raise the surface temperature of the interior crystalline recording layer above the layer melting point. Once above the melting point, the interior layer can transition from a crystalline state of high reflectivity to an amorphous state of low reflectivity. Subsequently, the rapid cooling of the layer prevents the molecular structure of the interior layer from reorganizing into a crystalline state. Hence, digital data can be mapped to a series of laser pulses which can write a digital code to the disk 102 which can correspond to the digital data.

Notably, depending upon capacity requirements, the disk 102 can have either one or two recordable sides. Additionally, the disk 102 can have multiple recordable layers per side. However, for purposes of understanding the invention, the number of sides and layers is irrelevant. Moreover, in the event of a double-sided recording, it also is irrelevant whether the recording of both sides of the disk 102 occurs from one or both sides of the disk 102.

Returning now to FIG. 1, the control section 120 preferably comprises a controller 122 and a navigation data generation circuit 126. The controller 122 supplies a first input signal to the navigation data generation circuit 126 and the servo 110 supplies a second input signal to the navigation data generation circuit 126. The servo can also be considered part of the control section 120. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disk 102 by the laser.

The controller 122 also preferably has access to the data contained in the track buffer 172 and record buffer 152 as shown in FIG. 1. The controller 122 can delete, modify, and reformat video data stored in the track buffer 172 and record buffer 152 for the purpose of implementing the inventive arrangements. Control and data interfaces are also preferably provided for permitting the controller 122 to control the operation of packet video encoder 144 and audio encoder 148 for implementing the inventive embodiments as described herein. Suitable software or firmware is provided in memory for the conventional operations performed by controller 122. In addition, program routines for the advanced features 134 are provided for controlling the controller 122 in accordance with the invention as shall hereinafter be described in greater detail.

A control buffer 132 for viewer activatable functions indicates those functions presently available, namely play, record, reverse, fast forward, pause/play and stop. The pause is a counterpart to pause operation in a VCR, for example manually interrupting the play back of a prerecorded program or interrupting the recording of a viewed program to eliminate commercials from the recording. A separate pause buffer 136 is provided to receive commands for performing the pause during record and playback function.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As each packet is constructed, each packet is combined with the output of the navigation data generation circuit in the MUX 154 and sent to the error correction coding circuit 128. Error correction coding circuit 128 can also be deemed to be part of the input path 140.

The output processing path 170 comprises a track buffer, or output buffer, 172, in which data read from the disk is assembled into packets for further processing. The packets are processed by conditional access circuit 174 that controls propagation of the packets through demultiplexer 176 and into respective paths for video and audio processing. The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184. The output processing path 170 can be deemed to include the error correction circuit 130, as noted.

Device 100 can represent a machine having, for example, a 1× read and 1× write capability. Such devices can typically have maximum data rates for recording or playing back of approximately 11 megabits/second. In order to implement some of the inventive arrangements is necessary to play back (read) and record (write) in a manner that appears to be simultaneous. Apparently simultaneous playing back and recording with such a machine would seem to be impossible, but even such a minimal capability machine can be advantageously operated in accordance with the inventive arrangements to provide apparently simultaneous playing back and recording as well as other inventive arrangements. It will also be appreciated that the inventive arrangements can also be useful for devices having higher data rates.

DVD Media

Figure 2:
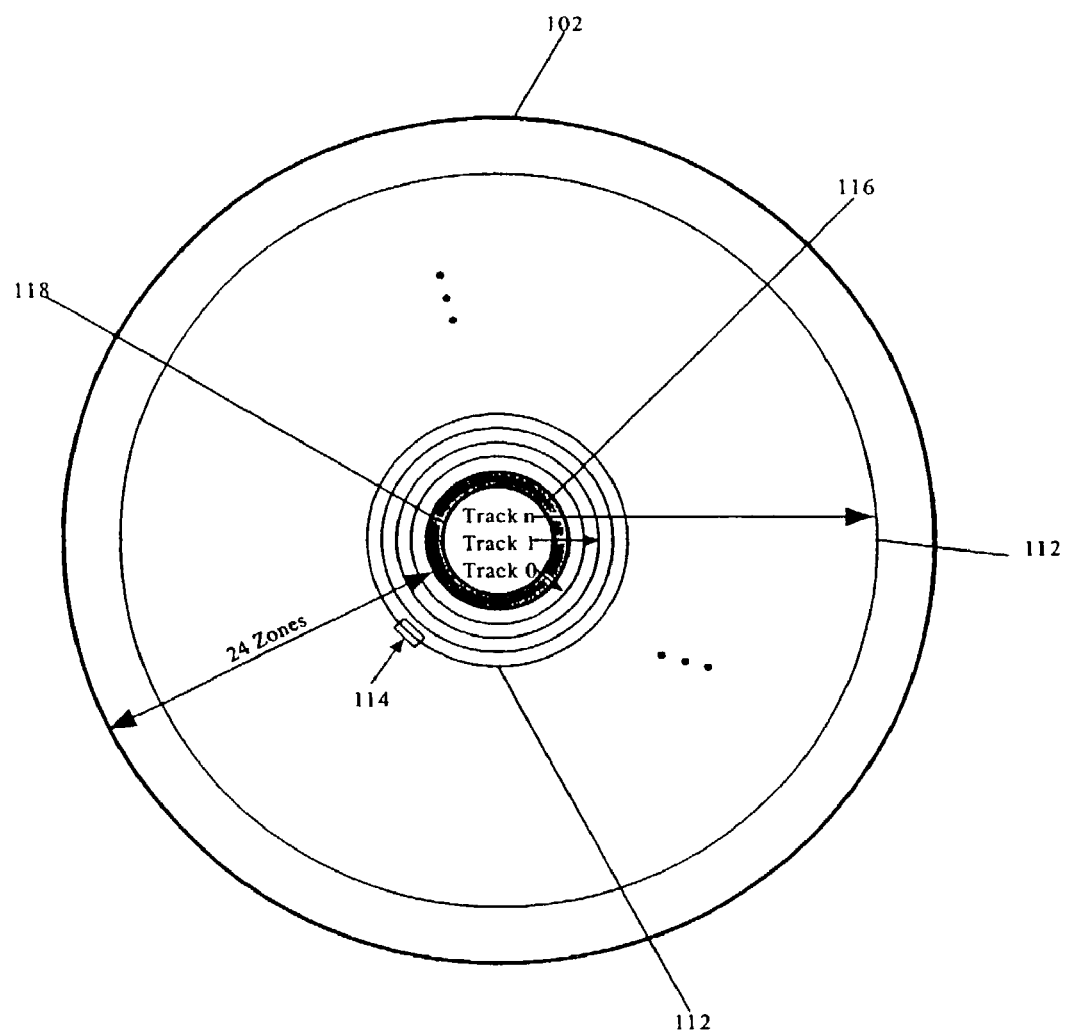
FIG. 2 is a schematic diagram of recordable DVD media.

For purposes of illustrating the inventive arrangements, program material can be recorded onto recordable DVD media, for example the re-writable DVD of FIG. 1, and played back from the re-writable DVD. The re-writable DVD 102, as shown in further detail in FIG. 2, can consist of two substrates bonded together by an adhesive layer forming a 1.2 mm thick disk. A center hole 118 can be formed in the center of the disk so that a gripping device of the motor 106 of FIG. 1 can securely grip the disk and control the angular motion of the same in accordance with the inventive arrangements.

As in convention DVD-RAM technology, the re-writable DVD 102 of the present invention incorporates a land/groove structure and phase change material to record data to disk. The land/groove combination forms a continuous spiral 112, with data recorded alternately on land and groove. Data can be written onto the re-writable DVD 102 in an outwardly direction along the spiral 112, beginning with the smaller radius portion of the spiral to the larger radius portion of the spiral 112. The several series of three large dots (_ _ _) denote portions of the spiral not shown in the drawing. Each nearly circular, radially concentric section of the spiral 112 is sometimes referred to as a track. Notably, the spiral 112 can be formed with a side-to-side wobble, not shown in the drawing, to accommodate media type indexing. Due to difficulties of scale only portions of the spiral 16 are shown, and these are shown in greatly enlarged scale.

To maintain constant data density across the surface of the re-writable DVD 102, the recording surface is divided into twenty-four (24) annular zones. Each zone has 1,888 tracks, including 944 land tracks and 944 grove tracks. Each track is divided into sectors 114 (only a single sector is shown for simplicity). The innermost zone has seventeen (17) sectors per track. The number of sectors per track increases by one in each succeeding zone. Hence, the outermost zone contains forty (40) sectors per track. Each sector 114 begins with a read-only identification field, embossed onto the disk surface. This identification field, known as the header, is used to identify the physical location of the sector and is kept separate from the user recordable data field, to assure that it is permanently readable. The re-writable DVD 102 can further include an embossed area 116 containing read-only data which can identify the type of media, for example DVD-RAM, DVD-ROM, or DVD-R.

It will be appreciated that the advanced features taught herein are applicable to other kinds of disk media and disk media players and recorders. Additionally, various modifications of the device illustrated in FIG. 1 and the disk medium illustrated in FIG. 2 can be used together to implement the advanced features taught herein in accordance with the inventive arrangements. In particular, a solution for defective sector management in accordance with the inventive arrangements can include modifications of and additions to hardware, firmware and software in the controller 122 for recording data to recordable DVD media.

DVD-ROM Backwards-Compatible Defective Sector Management in Recordable DVD Media The present invention can include a method for DVD-ROM backwards-compatible defective sector management in recordable DVD media. Notably, the present invention can be realized in hardware, software, or a combination of hardware and software. Machine readable storage according to the present invention can be realized in a centralized fashion in one computer system, for example the controller 122, or in a distributed fashion where different elements are spread across several interconnected computer systems. Any kind of computer system or other apparatus adapted for carrying out the methods described herein is acceptable.

Specifically, although the present invention as described herein contemplates the controller 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the controller 122 described above.

In accordance with the method of the invention, the following basic rule is enforced when recording data to recordable DVD media: certain indivisible data cannot become discontinuously stored in the recordable DVD media during the management of defects contained therein. More particularly, in order to maintain backwards compatibility with the DVD-ROM standard, the method of the invention can involve the enforcement of three rules.

First, sectors in the control data area, for example sectors storing a control table or map cannot become separated from one another by a defective sector. In particular, a defective sector in the control data area can invalidate the control data. Second, a defective sector cannot exist in a control backup file Finally, the first sector of a VOBU, which according to the DVD-ROM specification, must be a navigation sector, cannot be a defective sector Notably, although several techniques exist for detecting and locating defective sectors, in the preferred embodiment, defective sectors can be detected and located by referencing defect lists which can list defective sectors and associated addressing information. In the DVD-RAM specification, for example, defective sectors can be listed in a Primary Defect List (PDL) and a Secondary Defect List (SDL).

Figure 3A:
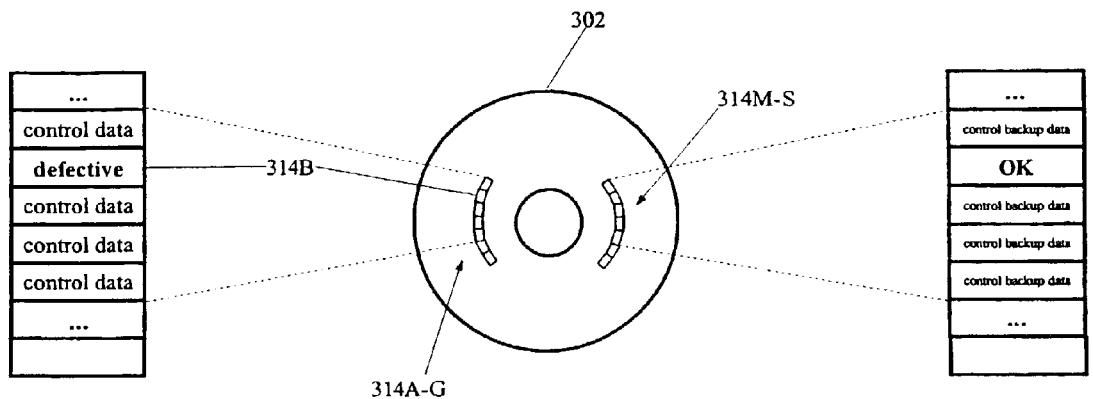
FIGS. 3A-3B, taken together, are schematic diagrams of a DVD-ROM backwards-compatible defective sector management method wherein the defective sector is in control data recorded to a control data area.
Figure 3B:
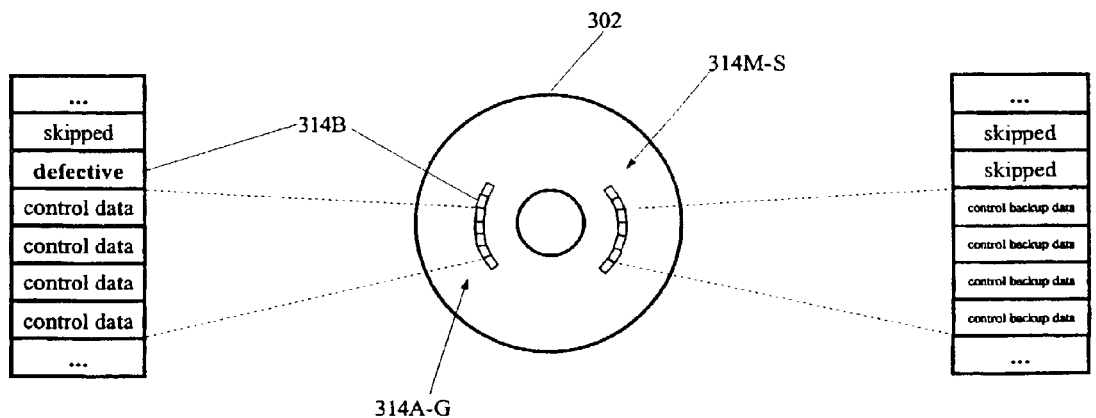

FIGS. 3A-3B, taken together, illustrate the first rule—a control map or control table in control data for managing a title, for example video manager information (VMGI) or video title set information (VTSI), can never contain a defective sector. In particular, FIG. 3A illustrates the allocation of control data to a first block of sectors 314A-E in a re-writable DVD disk 302. Significantly, sector 314B is a defective sector. As such, writing control data to the first block of sectors 314A-314E may violate the first rule. Accordingly, as shown in FIG. 3B, upon detecting and locating the defective sector 314B, the control data can be shifted to a second block of sectors 314C-314G. Notably, the second block of sectors 314C-314G does not contain a defective sector. Accordingly, the storage of the control data in the second block of sectors 314C-314G does not violate the first rule and the defective sector management technique utilized in this case remains DVD-ROM backwards-compatible.

Notably, conventional control data, for example a control table or control map, preferably has a corresponding backup file in a control data backup area. Each sector in the control data backup area has a logical address corresponding to a logical address in the control data area. In order to remain DVD-ROM backwards-compatible, control data in the control data area and associated backup control data in the control data backup area must be written to corresponding sectors having corresponding logical addresses. Therefore, even if there are no defective sectors in the control data backup area, if the enforcement of the first rule causes sectors to be skipped in the control data area, the corresponding sectors in the control data backup area also must be skipped as shown in FIG. 3B. Thus, even though no defective sectors exist in the block of sectors 314M-314Q, the backup control data must be shifted to a second block of sectors 3140-314S because the corresponding control data has been shifted to the second block of sectors 314C-314G.

One skilled in the art will recognize that the present invention is not to be limited to the precise selection of sectors in the second block. Although FIGS. 3A-3B show the second block of sectors to overlap the first block of sectors, the scope of the present invention contemplates a second block of sectors in which the sectors contained therein are not contained in the first block of sectors. Hence, the selection of the first and second block of sectors such that the second block overlaps the first block is shown for sake of simplicity and is not intended to limit the scope of the present invention.

Figure 4A:
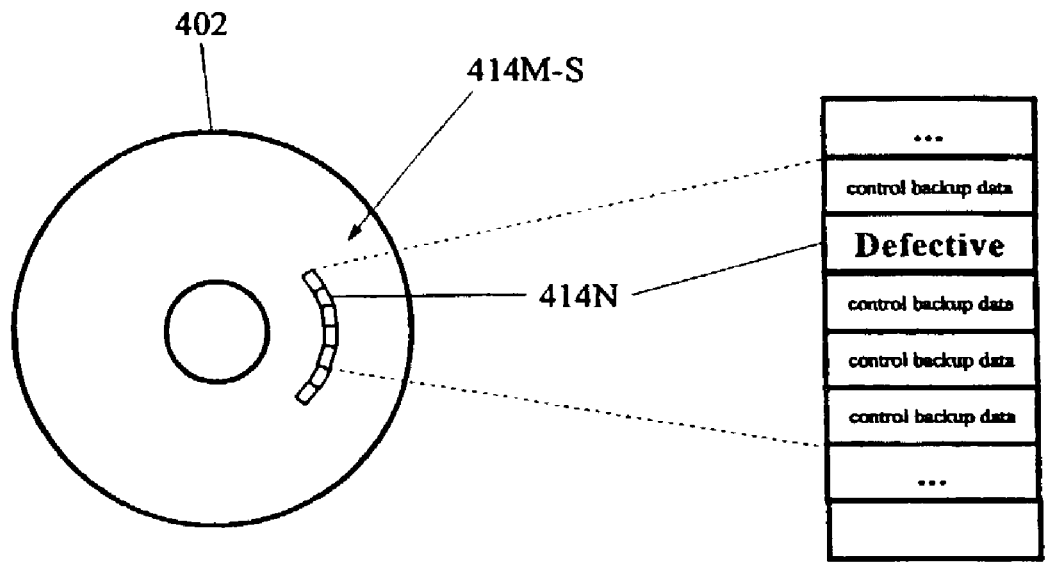
FIGS. 4A-4B, taken together, are schematic diagrams of a DVD-ROM backwards-compatible defective sector management method wherein the defective sector is in a backup control file in a control data backup file area.
Figure 4B:
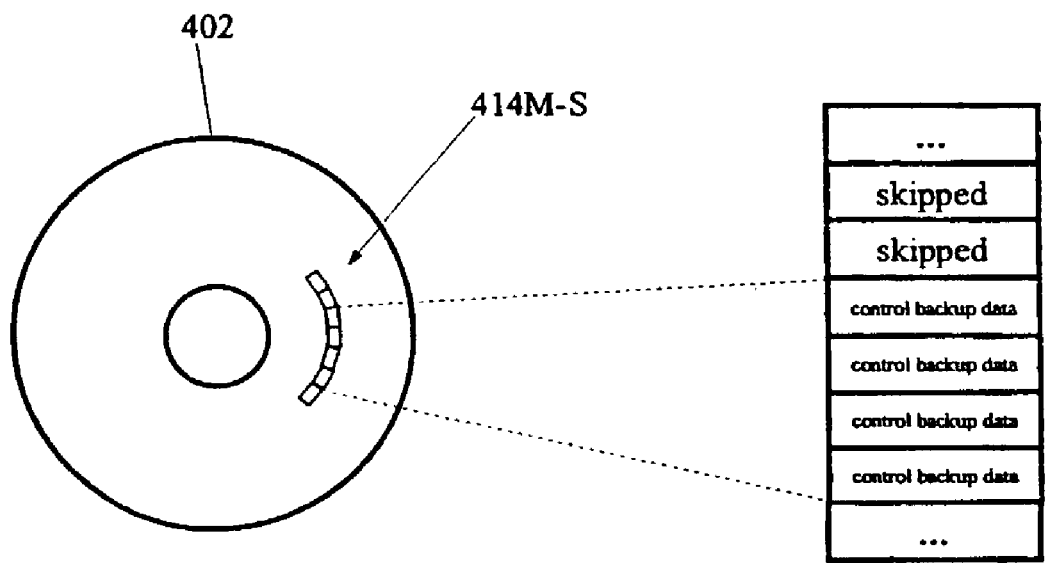

Turning now to FIGS. 4A-4B, if a defective sector is in a control data backup file area, the second rule can be applied—no defective sectors are allowed in a control data backup file. The second rule necessarily implies that each control data backup file must be recorded in a defect-free space on the disk. FIG. 4A illustrates the allocation of backup control data to a first block of sectors 414M-414Q in a re-writable DVD disk 402. Significantly, sector 414N is a defective sector. As such, writing control data to the first block of sectors 414M-414Q violates the second rule. Accordingly, as shown in FIG. 4B, upon detecting and locating the defective sector 414N, the backup control data can be shifted to a second block of sectors 4140-414S. Notably, the second block of sectors 4140-414S does not contain a defective sector. Accordingly, the storage of the backup control data in the second block of sectors 4140-414S does not violate the second rule and the defective sector management technique utilized in this case remains DVD-ROM backwards-compatible.

Figure 5A:
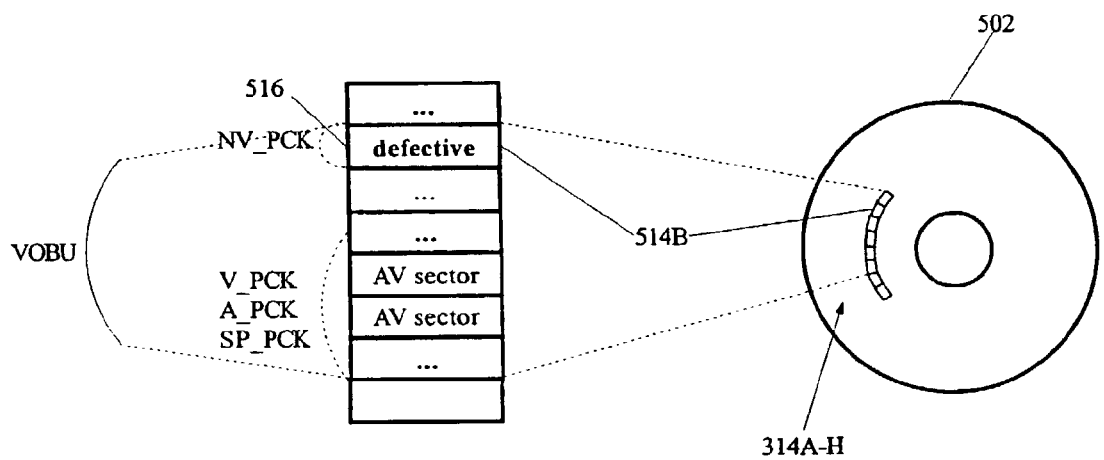
FIGS. 5A-5C, taken together, are schematic diagrams of a DVD-ROM backwards-compatible defective sector management method wherein the defective sector is in the first sector of a navigation pack in a VOBU.
Figure 5B:
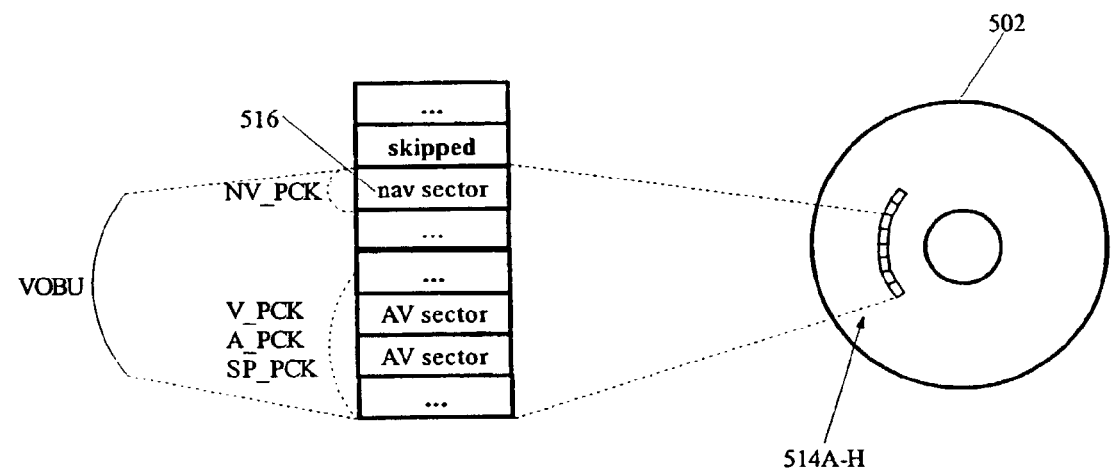
Figure 5C:
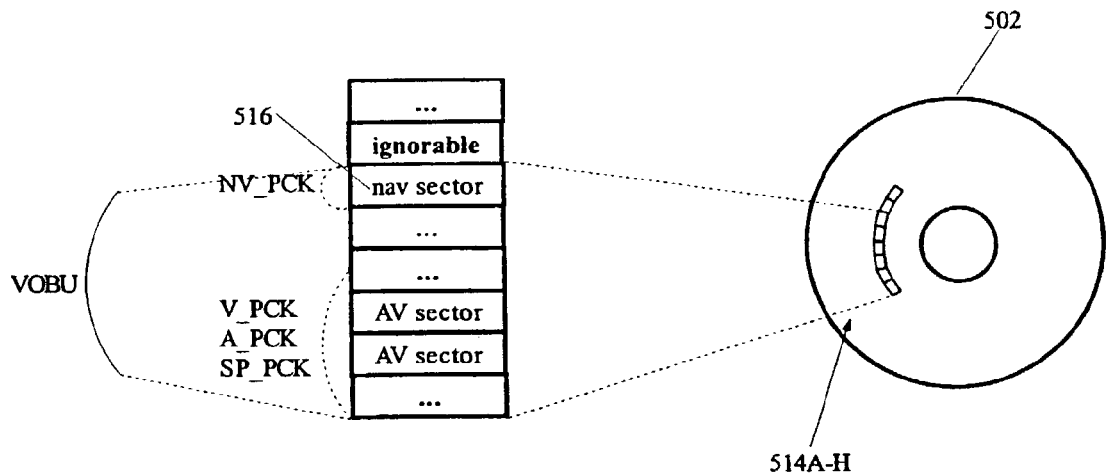

Finally, FIGS. 5A-5C illustrate the application of the third rule—the first sector of a VOBU, necessarily a navigation sector, cannot be a defective sector. So, the first block of sectors for storing a VOBU must be chosen such that the first sector (the navigation sector in the VOBU) is not a defective sector. FIG. 5A illustrates the allocation of a VOBU to a first block of sectors 514A-514F in a re-writable DVD disk 502. Notably, consonant with the DVD-ROM specification, the VOBU begins with a NV_PCK followed by AV data, for example sectors containing a V_PCK, A_PCK or an SP_PCK. Significantly, sector 514B is shown to be a defective sector. However, sector 514B also is shown to be allocated to store the navigation sector 516—the first sector in the VOBU. As such, writing the VOBU to the first block of sectors 514A-514F violates the third rule.

Accordingly, as shown in FIG. 5B, upon detecting and locating the defective sector 514B, the VOBU can be shifted to a second block of sectors 514C-514H. Notably, the first sector 514C of the second block of sectors 514C-514H is not a defective sector. Accordingly, the storage of the VOBU in the second block of sectors 514C-514H does not violate the third rule and the defective sector management technique utilized in this case remains DVD-ROM backwards-compatible.

Significantly, it can be important to disable a defective sector which can be used to store data in a VOBU. DVD-ROM readers which conform to the DVD-ROM specification will not attempt to read a defective sector. Consequently, in attempting to read a defective sector, a DVD-ROM reader may not adequately handle an exception caused by an attempt to read a defective sector. As shown in FIG. 5C, the method of the invention can include modifying a detected and located defective sector in the first block of sectors for storing the VOBU such that the modified defective sector emulates a non-defective sector containing ignorable data. As a result, a DVD-ROM reader will not attempt to access the data in the defective sector avoiding the potential exception.

Figure 6:
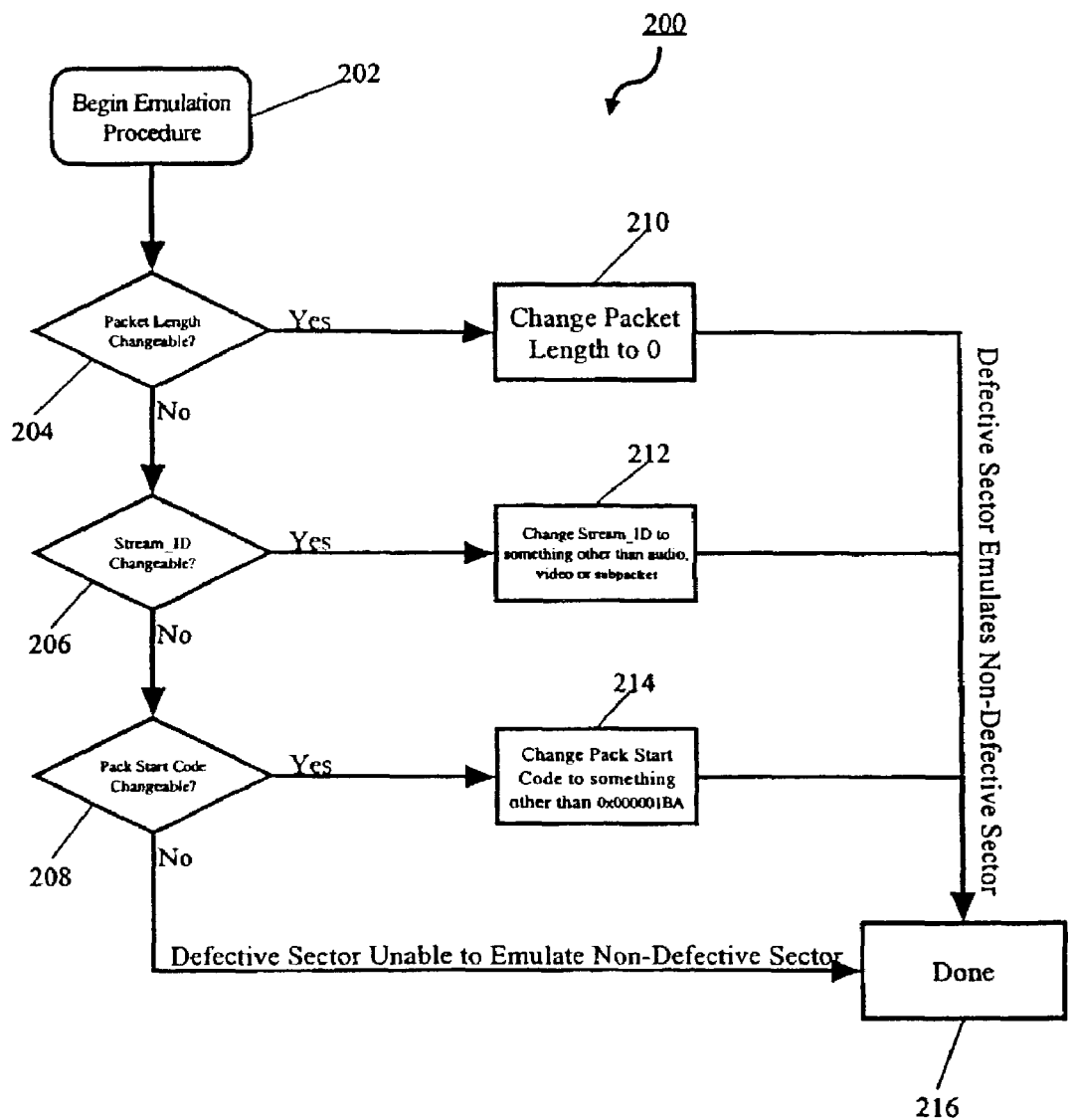
FIG. 6 is a flow chart illustrating a preferred method for modifying the defective sector of FIGS. 5A-5C so that the defective sector emulates an uncorrectable sector.
Figure 7:
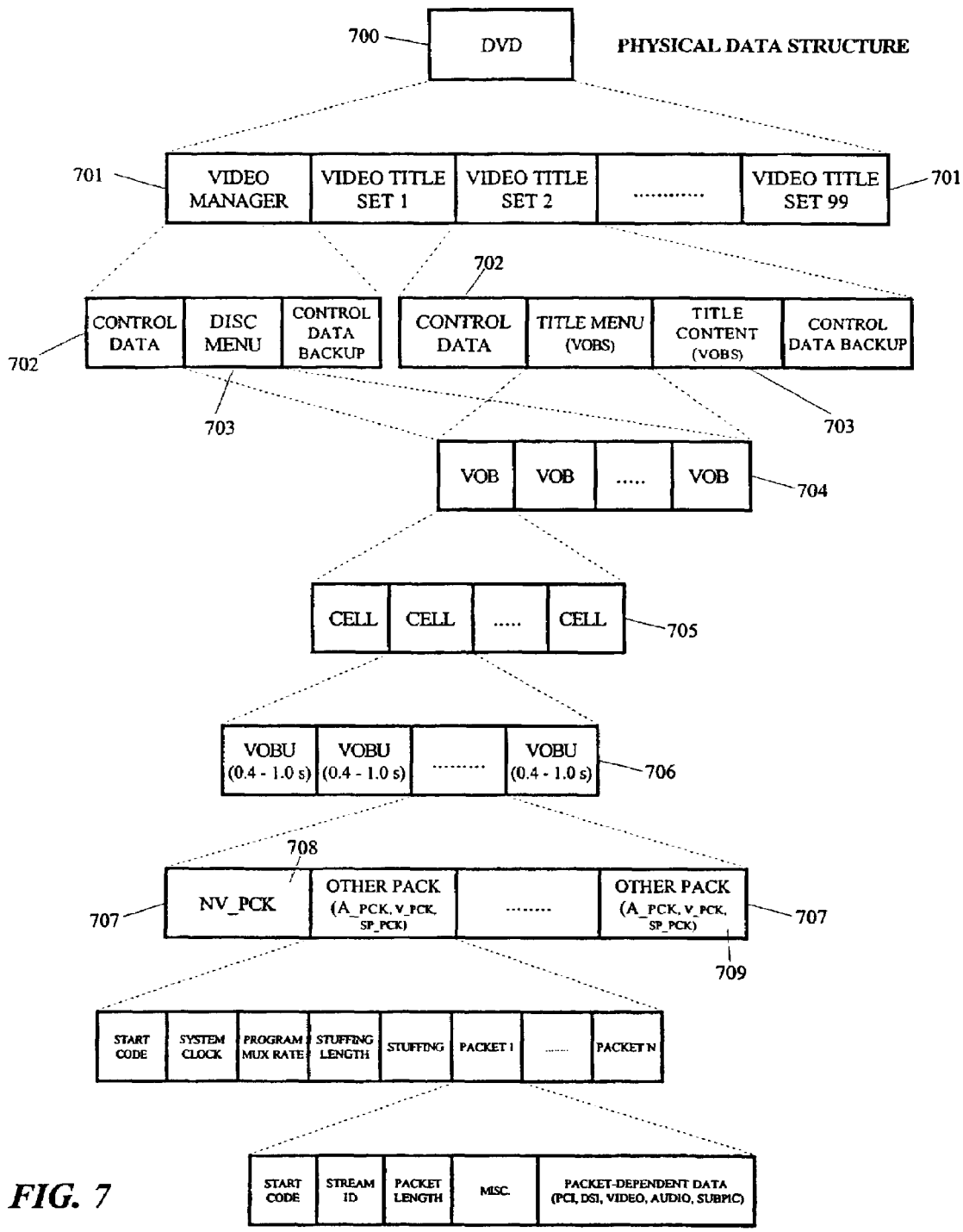
FIG. 7 is a block diagram illustrating a DVD file hierarchy.

FIG. 6 is a flow chart illustrating a method 200 for modifying a defective sector so that the modified defective sector emulates a non-defective sector. In particular, the method 200 can modify the first bytes of the defective sector which, had it not been for the defective sector management technique illustrated in FIGS. 5A-5B, would have been located in the first NV_PCK in the VOB. Notably, each sector in a VOB can contain a Start Code field, a Stream ID field, a Packet Length field and the actual packet data associated with the NV_PCK, A_PCK or SP_PCK. By modifying the Start Code field, the Stream ID field, the Packet Length field, or any combination thereof, a DVD-ROM player can be caused to conclude that the sector contains ignorable data.

The method can begin in step 202. In step 204, if despite the defect in the sector, the Packet Length field of the packet can be modified, in step 210, the Packet Length field can be changed to zero (0). Alternatively, in step 206, if the Stream ID field of the packet can be modified, in step 212 the Stream ID field can be changed to a value indicating data other than AV data (not audio, video or sub-packet data). Finally, in step 208, if the Start Code field can be modified, in step 214, data other than a Pack Start Code of 0x000001BA can be written to the Start Code field. As a result, the defective sector can emulate a non-defective sector. Advantageously, the enforcement of those rules illustrated in FIGS. 3A-3B, 4A-4B and 5A-5C can ensure that recordable DVD media remains backwards compatible with the DVD-ROM specification while further ensuring that the playback quality of the recordable DVD media does not become degraded.

The invention claimed is:

1. A method for DVD-ROM backwards-compatible defective sector management in recordable DVD media comprising the steps of:
   allocating a first block of logically contiguous sectors for storing indivisible data to the recordable DVD media, wherein said indivisible data is selected from at least one of the group comprising control data, backup control data, backup control data or navigation data and said indivisible data spans a plurality of logically contiguous sectors, including at least one non-defective sector, of said first block;

detecting and locating a defective sector in said first block of sectors; and, responsive to detecting and locating said defective sector, enforcing a rule that indivisible data cannot be discontinuously stored in the recordable DVD media such that said indivisible data is contiguously stored in a plurality of logically contiguous sectors of a second block by shifting said indivisible data from said first block to said second block in the recordable DVD media to ensure that the contiguity of the indivisible data is maintained, said second block not containing said detected and located defective sector.

2. The method of claim 1, wherein said indivisible data is control data and said first and second blocks of sectors are contained in a control data area of the recordable DVD media.

3. The method of claim 1, wherein said indivisible data is backup control data and said first and second block of sectors are contained in a control data backup area of the recordable DVD media.

4. The method of claim 1, wherein said indivisible data is the first sector of a video object unit ("VOBU") comprising a navigation sector, wherein said first sector is a navigation sector.

5. The method of claim 2, further comprising the step of:
shifting a backup copy of said control data from a first block of sectors in a control data backup area to a second block of sectors in said control data backup area, said second block in said control data backup area corresponding to said second block of sectors in said control data area.

6. The method of claim 1, wherein said step of detecting and locating comprises the step of:
consulting a defect list in the recordable DVD media, said defect list containing a list of sectors determined to be defective.

7. The method of claim 4, further comprising the step of:
modifying said defective sector, said modification emulating a non-defective sector,
whereby a DVD player playing back said VOBU in the recordable DVD media will not use data stored in the defective sector as if said defective sector is a non-detective sector containing non-usable data.

8. The method of claim 7, wherein said defective sector comprises a Start Code field, a Stream ID field, a Packet Length field and at least one Packet-Dependent data field.

9. The method of claim 8, wherein said step of modifying comprises the step of:
writing data other than a start code 0x000001BA to said Start Code field.

10. The method of claim 8, wherein said step of modifying comprises the step of:
writing an unusable stream ID to said Stream ID field.

11. The method of claim 8, wherein said step of modifying comprises the step of:
writing a zero value to said Packet Length field.

12. A DVD system for DVD-ROM backwards-compatible detective sector management in recordable DVD media comprising:
means for allocating a first block of logically contiguous sectors for storing indivisible data to the recordable DVD media, wherein said indivisible data is selected from at least one of the group comprising control data, backup control data or navigation data and said indivisible data spans a plurality of logically contiguous sectors, including at least one non-defective sector, of said first block;

means for detecting and locating a defective sector in said first block of sectors; and, means responsive to said detecting and locating means, for enforcing a rule that indivisible data cannot be discontinuously stored in the recordable DVD media such that said indivisible data is contiguously stored in a plurality of logically contiguous sectors of a second block by shifting said indivisible data from said first block to said second block in the recordable DVD media to ensure that the contiguity of the indivisible data is maintained, said second block not containing said detected and located defective sector.

13. The DVD system of claim 12, wherein said indivisible data is control data and said first and second blocks of sectors are contained in a control data area of the recordable DVD media.

14. The DVD system of claim 12, wherein said indivisible data is backup control data and said first and second block of sectors are contained in a control data backup area of the recordable DVD media.

15. The DVD system of claim 12, wherein said indivisible data is the first sector of a video object unit ("VOBU") comprising a navigation sector, wherein said first sector is a navigation sector.

16. The DVD system of claim 13, further comprising:
means for shifting a backup copy of said control data from a first block of sectors in a control data backup area to a second block of sectors in said control data backup area, said second block in said control data backup area corresponding to said second block of sectors in said control data area.

17. The DVD system of claim 12, wherein said detecting and locating means comprises:
means for consulting a defect list in the recordable DVD media, said defect list containing a list of sectors determined to be defective.

18. The DVD system of claim 15, further comprising:
means for modifying said defective sector, said modification emulating a non-defective sector,
whereby a DVD player playing back said VOBU in the recordable DVD media will not use data stored in the defective sector as if said defective sector is a non-defective sector containing non-usable data.

19. The DVD system of claim 18, wherein said defective sector comprises a Start Code field, a Stream ID field, a Packet Length field and at least one Packet-Dependent data field.

20. The DVD system of claim 19, wherein said modifying means comprises:
means for writing data other than a start code 0x000001BA to said Start Code field.

21. The DVD system of claim 19, wherein said modifying means comprises:
means for writing an unusable stream ID to said Stream ID field.

22. The DVD system of claim 19, wherein said modifying means comprises:
means for writing a zero value to said Packet Length field.

23. A machine readable storage, having stored thereon a computer program for DVD-ROM backwards-compatible defective sector management in recordable DVD media, said computer program having a plurality of code sections executable by a machine for causing the machine to perform the steps of:

allocating a first block of logically contiguous sectors for storing indivisible data to the recordable DVD media, wherein said indivisible data is selected from at least one of the group comprising control data, backup control data or navigation data and said indivisible data spans a plurality of logically contiguous sectors, including at least one non-defective sector, of said first block;

detecting and locating a defective sector in said first block of sectors; and, responsive to detecting and locating said defective sector, enforcing a rule that indivisible data cannot be discontinuously stored in the recordable DVD media such that said indivisible data is contiguously stored in a plurality logically contiguous sectors of a second block by shifting said indivisible data from said first block to said second block of logically contiguous sectors in the recordable DVD media to ensure that the contiguity of the indivisible data is maintained, said second block not containing said detected and located defective sector.

24. The machine readable storage of claim 23, wherein said indivisible data is control data and said first and second blocks of sectors are contained in a control data area of the recordable DVD media.

25. The machine readable storage of claim 23, wherein said indivisible data is backup control data and said first and second block of sectors are contained in a control data backup area of the recordable DVD media.

26. The machine readable storage of claim 23, wherein said indivisible data is the first sector of a video object unit ("VOBU") comprising a navigation sector, wherein said first sector is a navigation sector.

27. The machine readable storage of claim 24, for further causing the machine to perform the step of:

shifting a backup copy of said control data from a first block of sectors in a control data backup area to a second block of sectors in said control data backup area, said second block in said control data backup area corresponding to said second block of sectors in said control data area.

28. The machine readable storage of claim 23, wherein said step of detecting and locating comprises the step of:

consulting a defect list in the recordable DVD media, said defect list containing a list of sectors determined to be defective.

29. The machine readable storage of claim 26, for further causing the machine to perform the step of:

wherein said defective sector is a sector of a VOBU, modifying said defective sector; said modification emulating a non-defective sector, whereby a DVD player playing back said VOBU in the recordable DVD media will not use data stored in the defective sector as if said defective sector is a non-defective sector containing non-usable data.

30. The machine readable storage of claim 29, wherein said defective sector comprises a Start Code field, a Stream ID field, a Packet Length field and at least one Packet-Dependent data field.

31. The machine readable storage of claim 30, wherein said step of modifying comprises the step of:

writing data other than a start code 0x000001BA to said Start Code field.

32. The machine readable storage of claim 30, wherein said step of modifying comprises the step of:

writing an unusable stream ID to said Stream ID field.

33. The machine readable storage of claim 30, wherein said step of modifying comprises the step of:

writing a zero value to said Packet Length field.

\* \* \* \* \*